(12) United States Patent
Loui et al.

(10) Patent No.: US 6,961,463 B1
(45) Date of Patent: Nov. 1, 2005

(54) METHOD OF DETECTING DUPLICATE PICTURES IN AN AUTOMATIC ALBUMING SYSTEM

(75) Inventors: Alexander C. Loui, Penfield, NY (US); Eric S. Pavie, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/537,334

(22) Filed: Mar. 29, 2000

(51) Int. Cl.[7] .............................................. G06K 9/00
(52) U.S. Cl. ...................................... 382/170; 382/305
(58) Field of Search ................................ 382/168, 170, 382/195, 305; 707/3–6; 348/161, 231.5, 348/231.2, 231.3

(56) References Cited

U.S. PATENT DOCUMENTS

| | | | | |
|---|---|---|---|---|
| 4,143,956 A | * | 3/1979 | Miyagawa | 396/318 |
| 5,644,765 A | * | 7/1997 | Shimura et al. | 382/305 |
| 5,796,428 A | * | 8/1998 | Matsumoto et al. | 348/207.99 |
| 5,805,215 A | * | 9/1998 | Mizoguchi | 348/231.5 |
| 6,163,622 A | * | 12/2000 | Abdel-Mottaleb et al. | 382/170 |
| 6,400,853 B1 | * | 6/2002 | Shiiyama | 382/305 |
| 6,445,818 B1 | * | 9/2002 | Kim et al. | 382/170 |
| 6,584,221 B1 | * | 6/2003 | Moghaddam et al. | 382/165 |
| 6,721,449 B1 | * | 4/2004 | Krishnamachari | 382/165 |

FOREIGN PATENT DOCUMENTS

EP  0 990 996 A2  4/2000

OTHER PUBLICATIONS

U.S. Appl. No. 09/163,618, filed Sep. 30, 1998, Loui et al.
U.S. Appl. No. 09/197,365, filed Nov. 20, 1998, Loui et al.
"Statistical Models in Engineering", Gerald J. Hahn, & Samuel S. Shapiro, Research & Development Center, General Electric Co., John Wiley & Sons, Inc., Copyright 1967, pp. 36-39.
Loui A.C. et al: "A Software System for Automatic Albuming of Consumer Pictures", ACM Multimedia, Proceedings Of The International Conference, New York, NY, USA, 1999, pp. 159-162, XP002220769 abstract, section 2.1., System Features, section 2.2., Software Architexture.
Change E. Y. et al: "Rime: A Replicated Image Detector For The World-Wide Web" Proceedings of the Spie, Spie, Bellingham, VA, US, vol. 3527, 1998, pp. 58-67, XP000925499, ISSN: 0277-786X abstract, sections 1.1, 3.2.
Yinhong Gong et al: "Image Indexing Retrieval Based on Color Histograms", Multimedia Tools and Applications, Kluwer Academic Publishers, Boston, US, vol. 2, No. 2, Mar. 1, 1996, pp. 133-156, XP000646007, ISSN: 1380-7501, abstract, p. 135 paragraphs 1, 4-5 (discussion of ' '7!), p. 139 last paragraph (block color histograms).

(Continued)

Primary Examiner—Vikkram Bali
Assistant Examiner—Colin LaRose
(74) Attorney, Agent, or Firm—David M. Woods

(57) ABSTRACT

Duplicate images are detected by providing at least two images captured at determinable times; computing an indication of the image content for each image; determining the time of capture of each of the images; and evaluating the indication of image content and the time of capture to determine whether the images are duplicate images. The images are divided into blocks and the indication of image content is computed from a histogram for each block. Thereafter, the step of evaluating the indication of image content and the time of capture comprises comparing one or more blocks of one image, using a histogram intersection metric, to corresponding blocks of another image and using the time difference between capture of the two images to determine whether the images are duplicate images.

25 Claims, 6 Drawing Sheets

OTHER PUBLICATIONS

Swain M.J. et al: "Indexing Via Color Histograms", Proceedings of the International Conference on Computer Vision, OSAKA, Dec. 4-7, 1990, Los Alamitos, IEEE Comp. Soc. Press, U.S., vol. Conf. 3, Dec. 4, 1990, pp. 390-393, XP010020081, ISBN: 0-8186-2057-9, Section 2.1.

Kerry Rodden: "How Do People Organise Their Photographs?", Proceedings of the BCS IRSG 21st Annual Colloquium on Information Retrieval Research, 19-20 Apr. 1999, pp. 1-11, XP002277908, Glasgow, Sections 3.3, 4.3.

* cited by examiner

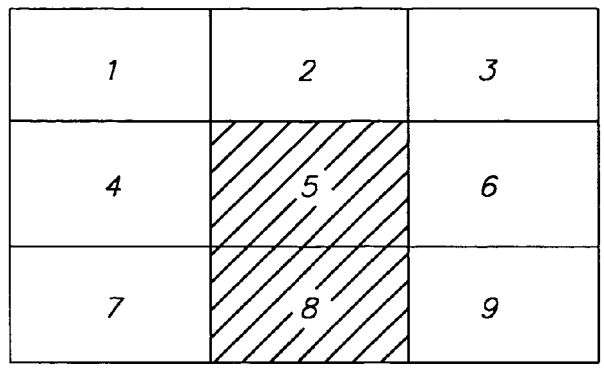
FIG. 4
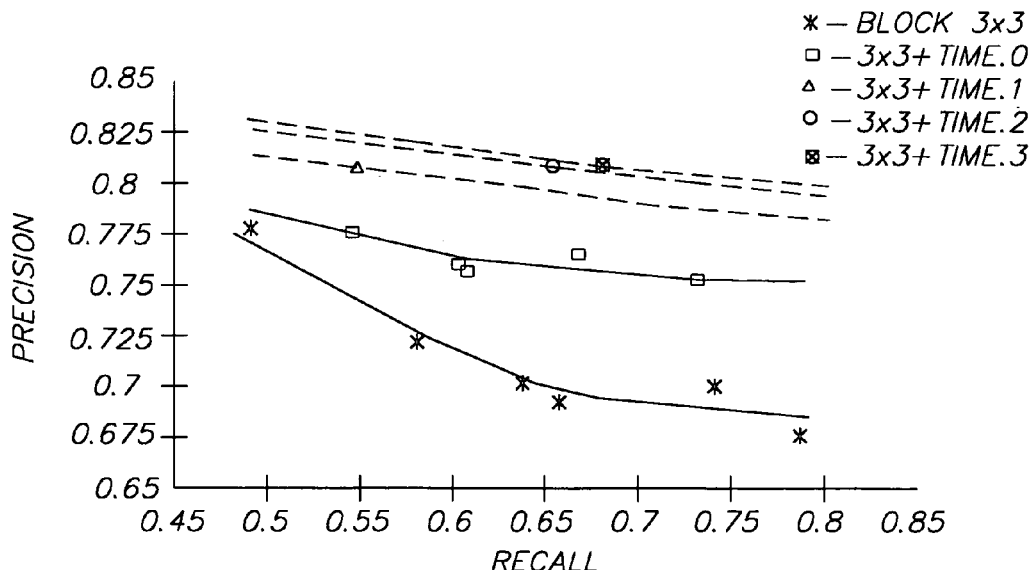
FIG. 6
| BLOCK-BASED HISTOGRAM TECHNIQUE | 3x3 BLOCKS TECHNIQUE |
|---|---|
| R = 0.644<br>PR = 0.654 | R = 0.655(+1.7%)<br>PR = 0.694(+6.1%) |
| 3x3 BLOCKS TECHNIQUE WITH TIME INFORMATION | 3x3 BLOCKS TECHNIQUE WITH TIME FINAL VERSION |
|---|---|
| R = 0.667(+1.8%)<br>PR = 0.766(+10.4%) | R = 0.679(+1.9%)<br>PR = 0.810(+5.7%) |
FIG. 7

Picture A

Picture B

METHOD OF DETECTING DUPLICATE PICTURES IN AN AUTOMATIC ALBUMING SYSTEM

CROSS-REFERENCE TO RELATED APPLICATION(S)

The present application is related to U.S. application Ser. No. 09/163,618, filed Sep. 30, 1998, by Alexander C. Loui and Eric S. Pavie, and entitled, "A METHOD FOR AUTOMATICALLY CLASSIFYING IMAGES INTO EVENTS" and to U.S. application Ser. No. 09/197,363, filed Nov. 20, 1998, by Alexander C. Loui and Eric S. Pavie, and entitled, "A METHOD FOR AUTOMATICALLY COMPARING CONTENT OF IMAGES FOR CLASSIFICATION INTO EVENTS".

FIELD OF THE INVENTION

The invention relates generally to the field of image processing systems that automatically classify pictures by events and the like and, more particularly, to an automatic classification and albuming system that automatically classifies pictures for placement into an album.

BACKGROUND OF THE INVENTION

Pictorial images are often classified by the particular event, subject, or the like for convenience of retrieving, reviewing, and albuming of the images. This classification is usually achieved by either manually or automatically segmenting the images into appropriate groups. A manual method would involve visually inspecting each image and then placing the image into the appropriate group. An automated albuming method would typically group the images in some automatic manner by color, shape or texture in order to partition the images into groups of similar image characteristics.

Although the presently known and utilized methods for partitioning images are satisfactory, there are drawbacks. The manual classification method is obviously time consuming, and the automated albuming method, although theoretically classifying the images into events, is susceptible to misclassification due to the inherent inaccuracies involved with classification by color, shape or texture. In either method, when two pictures are identified as duplicates, one of them is typically removed and will not appear in the resulting album. Since a consumer will not be satisfied if the automatic albuming process removes a picture that should have been in the album, the precision of the duplicate detection algorithm has to be high. Consequently, a need exists for overcoming the above-described drawbacks.

SUMMARY OF THE INVENTION

The present invention is directed to overcoming one or more of the problems set forth above. Briefly summarized, according to one aspect of the present invention, the invention resides in a method for detecting duplicate images comprising the steps of providing at least two images captured at determinable times; computing an indication of the image content for each image; determining the time of capture of each of the images; and evaluating the indication of image content and the time of capture to determine whether the images are duplicate images.

In a further aspect of the invention, the images are divided into blocks and the indication of image content is computed for each block. More specifically the indication of image content is computed from a histogram for each block. Thereafter, the step of evaluating the indication of image content and the time of capture comprises comparing one or more blocks of one image, using a histogram intersection metric, to corresponding blocks of another image and using the time difference between capture of the two images to determine whether the images are duplicate images. Moreover, the step of computing an indication of image content may include dividing each image into blocks, wherein one or more blocks represent a foreground area of the images, and computing an indication of image content in each block and in the foreground areas of each block.

Consequently, according to this method image content is analyzed to determine duplicates by the similarity of content of the images and the time of exposure. If the image contents are similar and the time difference between exposures is within a certain threshold, then the images are duplicates. If no time and date information is available, the image content alone can be used.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

When two pictures are identified as duplicates, one of them is removed and will not appear in the album. Since the consumer will not be satisfied if the automatic albuming process removes a picture that should have been in the album, the precision of the duplicate detection algorithm has to be high. The present invention provides for an automatic albuming process with such a high precision rate.

BRIEF DESCRIPTION OF THE DRAWINGS

FIG. 4 shows the area covered by a 3×3 arrangement of blocks, including foreground areas represented by blocks 5 and 8;

FIG. 6 shows the comparisons between various 3×3 blocks techniques showing the effect of using (and not using) time information, using the average of the nine histogram intersection values, and using the rules shown with regard to FIG. 1; and FIG. 7 shows a table summarizing the improvements made according to the invention to the duplicate detection method.

DETAILED DESCRIPTION OF THE INVENTION

In the following description, the present invention will be described in the preferred embodiment as a software program. Those skilled in the art will readily recognize that the equivalent of such software may also be constructed in hardware. Given the system and method as shown and described according to the invention in the following materials, software not specifically shown, described or suggested herein that is useful for implementation of the invention is conventional and within the ordinary skill in such arts. Still further, as used herein, computer readable storage medium may comprise, for example; magnetic storage media such as a magnetic disk (such as a floppy disk or a hard drive) or magnetic tape; optical storage media such as an optical disc, optical tape, or machine readable bar code; a solid state electronic storage device such as random access memory (RAM), or read only memory (ROM); or any other physical device or medium employed to store a computer program.

Figure 1:
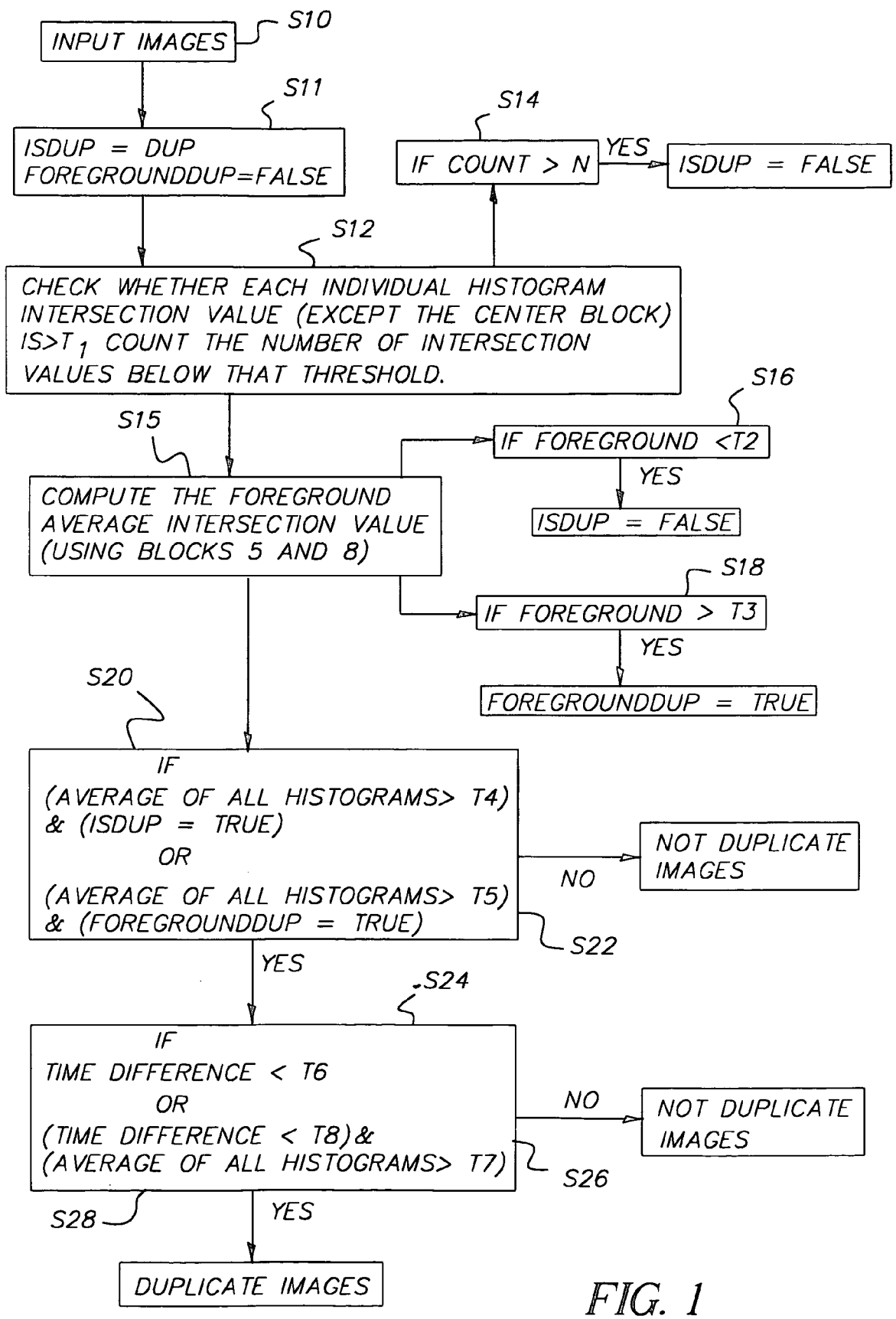
FIG. 1 is a block diagram illustrating an overview of the present invention.

Referring now to FIG. 1, there is illustrated a flow diagram illustrating an overview of the present invention. Digitized images are input into a computer system in step S10, where a software program will classify them into distinct categories. For instance, the images will be ranked in chronological order by analyzing the time of capture of each image (date may also be used to isolate the time by day, and in the absence of time, date alone can provide a gross estimate of chronological order). The time of capture of each picture may be extracted, for example, from the encoded information on the film strip of the Advanced Photo System (APS) images, or from information available from some digital cameras. Furthermore, each image is divided into N×N blocks (with N=2, 3 or 4 in typical implementations). In the preferred embodiment, the image is divided into 3×3 blocks, as shown in FIG. 4. For each block, an indication of image content is computed; more specifically, a color histogram is computed for each block (exemplary histograms of the center block are shown for two similar images in FIGS. 5A and 5B). Then each block of one image is compared, using a conventional histogram intersection metric, to the corresponding block of another image. (The histogram intersection metric is described in the aforementioned U.S. Pat. No. 6,606,411 and has the formula $$Inter(R, C) = \frac{\sum_{i=1}^{n} \min(R_i, C_i)}{\sum_{i=1}^{n} R_i}$$

where R is the histogram of the reference, C is the histogram of the candidate, and n is the number of bins in the histogram.

At the beginning of the process, two flags IsDup and ForegroundDup are set to true and false, respectively, in a step S11. Then, in a step S12, the individual histogram intersection value for each block (except for the center block) is checked to determine whether it is higher than a certain threshold $T_1$, and the number of intersection values below the threshold $T_1$ are counted. If the number of blocks with intersection values below the threshold $T_1$ are found in a step S14 to be greater than a certain number N, then the flag IsDup is set to false. Next, the foreground average histogram intersection value is computed in step S15 for a foreground area of the image (where foreground, for purposes of a 3×3 block, is defined as blocks 5 and 8, as shown in FIG. 4). If the foreground average histogram intersection value is found in a step S16 to be less than a certain threshold $T_2$, then the flag IsDup is set to false. If the foreground average histogram intersection value is found in a step S18 to be higher than a certain threshold $T_3$, then the flag ForegoundDup is set to true.

Next, the average of all histogram intersection values for all blocks of each image calculated and checked in a step S20 to determine whether that average histogram intersection value is greater than a threshold $T_4$ (with the flag IsDup being true), and further checked in a step S22 to determine whether that average histogram intersection value is greater than another threshold $T_5$ (where $T_5<T_4$, and where the flag ForegreoundDup is true). If neither one of these conditions is satisfied, then the decision is made that the image(s) are not duplicate images. If either one of these conditions is satisfied, the decision regarding duplicates is not made at this point. Then, in step S24 the time difference between the two images is checked to determine whether it is less than a certain threshold $T_6$, and further in step S28 checked to determine whether it is less than another threshold $T_8$ (where $T_6<T_8$). If the condition in step 24 is satisfied, or if the condition in step 28 is satisfied in combination with the aforementioned average of all histogram intersection values being found greater in a step 26 than another threshold $T_7$ (with $T_5<T_4<T_7$), then the decision is made that the image(s) are duplicate images. Otherwise, the images are determined not to be duplicate images.

In summary, the rules for determining whether an image is a duplicate of another image is as follows:

a) If S14 and S16 are not satisfied, and S20 and S24 are satisfied, the pictures are duplicates.

b) If S14 and S16 are not satisfied, and S20, S26 and S28 are satisfied, the pictures are duplicates.

c) If S18, S22, and S24 are satisfied the pictures are duplicates.

d) If S18, S22, S26 and S28 are satisfied the pictures are duplicates.

e) Otherwise the pictures are not duplicates.

The goal of the duplicate detection algorithm outlined in FIG. 1 is to identify whether two pictures are so similar that a consumer would only put one of them in an album. A workable definition of a duplicate is as follows: duplicates are defined as two photographs that have the same content and composition, as well as being taken from the same angle and range. Typically, substantially exactly the same content and composition are required to establish a duplicate, although a small variation in angle and/or range may be tolerated. Consequently, the duplicate detection method is trying to recall the "almost identical" pictures, i.e., the two pictures should have almost the same colored pixels at almost the same locations. Obviously, a pixel to pixel comparison will not work well, since there will always exist a small shift; on the other hand, a global color histogram approach will not be accurate enough due to the lack of information about the pixels' locations. The block histogram approach gives semi-local information on the pixel colors and some information of location within the image. The blocks cannot be too big so that the small shift between the images will not affect the accuracy. In the experiment as described below, we decided to divide the image into 3×3 blocks, as shown in FIG. 4.

EXPERIMENT

We have found that date and time information can be very useful in achieving the goal of the duplicate detection algorithm. Indeed, according to the aforementioned definition of duplicates, it would clearly appear that such pictures are usually taken within a short period of time. By setting different thresholds in coordination with the image similarity values, as shown and described in connection with FIG. 1, we were able to improve the quality of the duplicate detection significantly.

In order to benchmark and verify the algorithm, a third party ground truth database was set up. Four hundred forty three (443) pictures were carefully chosen from the database. The pictures are all duplicates candidates, including a lot of pictures that are obviously not duplicates for a human eye but might be for a machine readable apparatus (same picture but different people, etc.). The database contains about 270 pairs. The third party ground truth has been based on the participation of ten observers. Each observer was given a definition of what are duplicates pictures plus some explanation of how to make a decision. In addition, it was explained to the observers not to put themselves in the place of the consumer, that is, not to develop a like or dislike for the images, but to put themselves in the place of a third party person. Ideally, the interest of the pictures to the observers should not influence their decision whether the images are duplicates. The observers were told that their input will be used for the benchmarking of a duplicate detection system.

The output of the duplicate detection method is binary, meaning that a picture is flagged as either a duplicate or not a duplicate. Nevertheless, what the ground truth study provides, for each pair of pictures, is a probability of the pair being duplicates. The metric used to benchmark the method is based on a Recall variable versus a Precision variable, where:

$$\text{Recall} = \frac{\text{\# correct}}{\text{\# correct} + \text{\# missed}} \text{ and Precision} = \frac{\text{\# correct}}{\text{\# correct} + \text{\# false positive}} \quad \text{(Eq. 1)}$$

Figure 2:
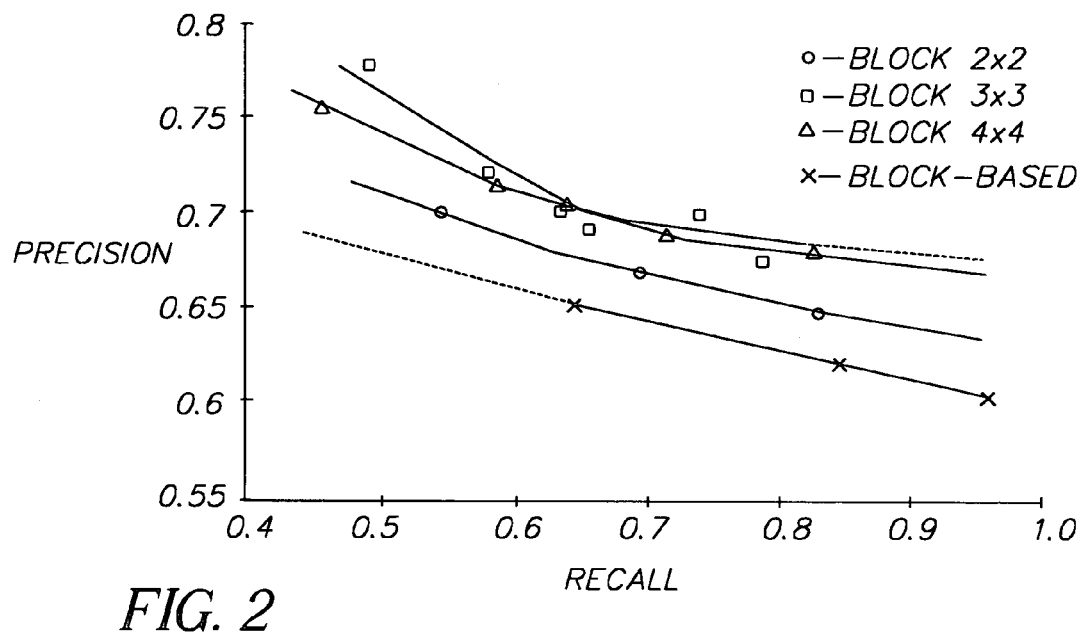
FIG. 2 shows a comparison of Recall versus Precision curves determined for different block sizes, including 2×2, 3×3 and 4×4 block sizes.

The first step was to determine the number of blocks into which the images would be divided. In the aforementioned Ser. No. 09/163,618, a block-based histogram technique was used for event classification but it involved a much larger number of blocks. In the comparative illustration of FIG. 2, Recall versus Precision curves were generated for the 2×2 blocks, 3×3 blocks, 4×4 blocks techniques and for a block-based histogram technique involving a larger number of blocks. For the several N×N blocks techniques, an average of the histogram intersections is computed and a threshold is applied. The Recall versus Precision curves are obtained by varying the threshold for each technique. The results of the comparison are shown in FIG. 2. FIG. 2 shows that the new approach with smaller blocks is better than a block-based histogram technique involving a larger number of blocks for the detection of duplicates. It also appears clear that the results of the 3×3 blocks and the 4×4 blocks approaches exceed the results of the 2×2 blocks approach. We decided to use the 3×3 blocks approach for the following reasons: 1) the results are slightly better than with the use of 4×4 blocks; and 2) the 3×3 blocks approach has the advantage of having a middle block, which for the majority of the pictures is likely to contain the main subject.

The next step was to determine the influence of the date and time information on the quality of the results. Date and time information turned out to be very relevant information, and enabled us to improve the precision of the results significantly, even though only 57% of the pictures had date and time information. Adaptive thresholds were set up for the time, all optimized for this database.

Figure 3:
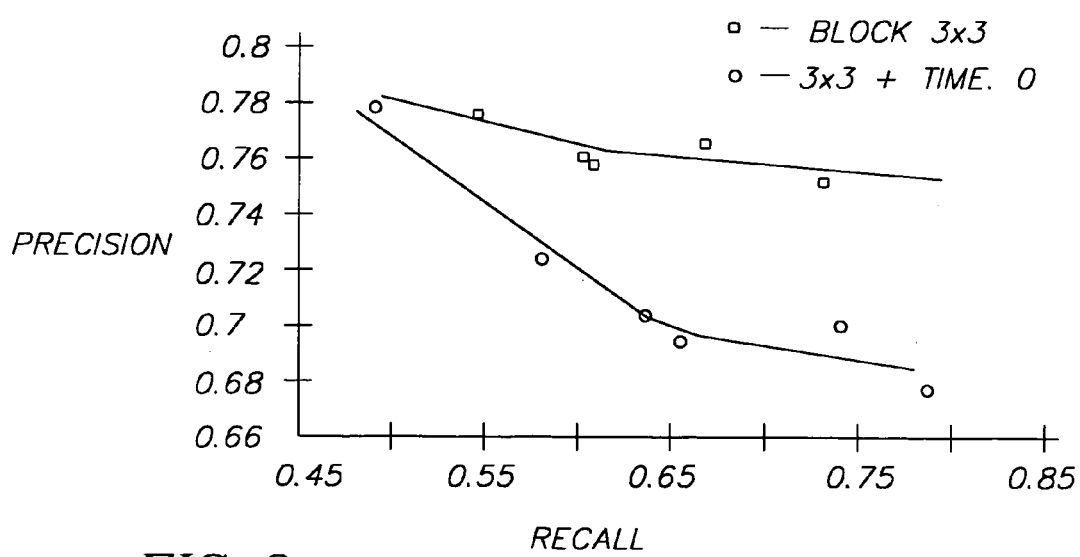
FIG. 3 shows the results of the comparisons between a 3×3 blocks technique with and without the use of time information.

FIG. 3 shows the results of a comparison between a 3×3 blocks technique without the use of time information and a 3×3 blocks technique with the use of time information. FIG. 3 shows that for reasonable Recall, between 0.65 and 0.75, the precision obtained with date and time included is much higher with an average improvement of 0.065, or 9%. Finally, we optimized the thresholding technique on each block. In addition to the threshold on the average histogram intersections, a threshold on each histogram intersection and a threshold on the average histogram intersections of blocks 5 and 8 have been set up. The blocks 5 and 8 are very likely to contain the main subject. They generally represent the foreground of the image. FIG. 4 shows the area covered by blocks 5 and 8.

Figure 5A:
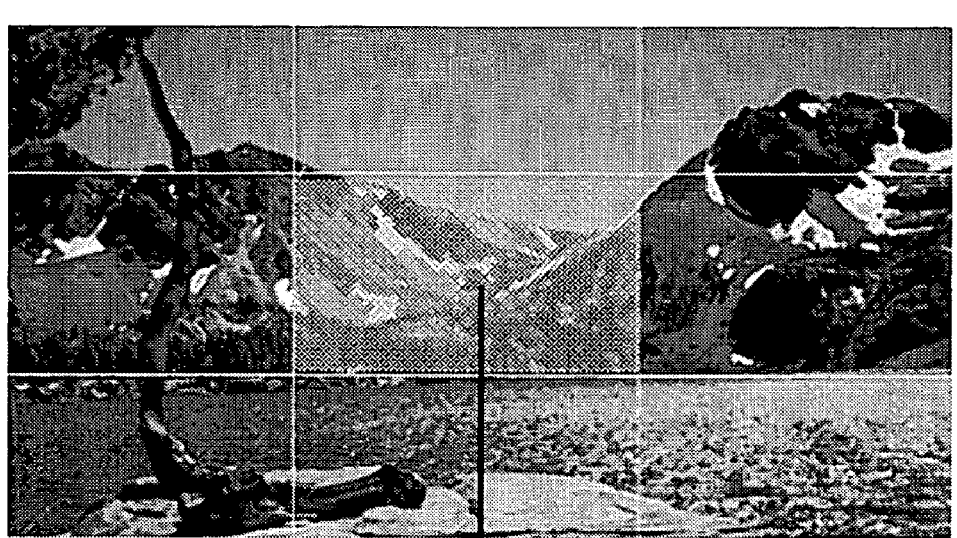
FIGS. 5A and B show examples of color histograms for the central area covered by block 5 as shown in FIG. 4.
Figure 5A:
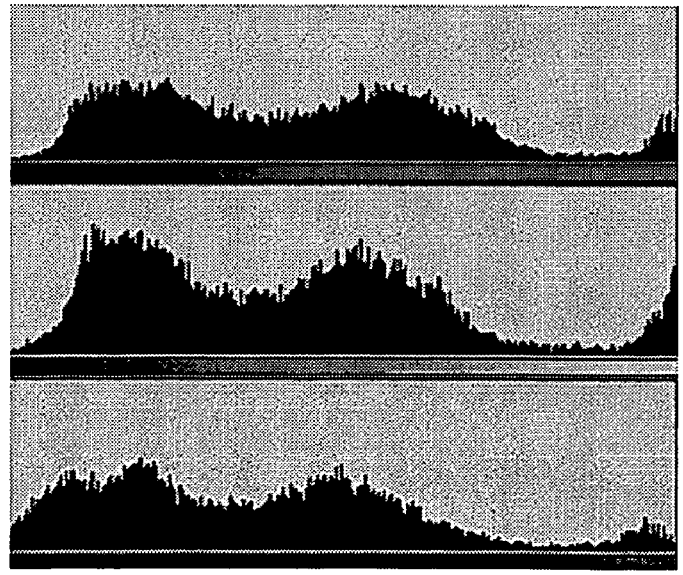
Figure 5B:
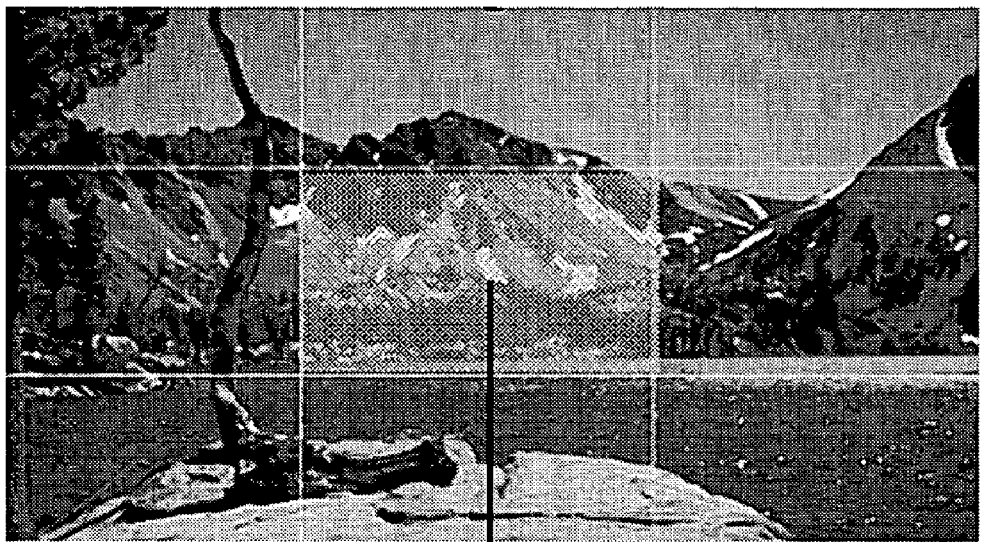
Figure 5B:
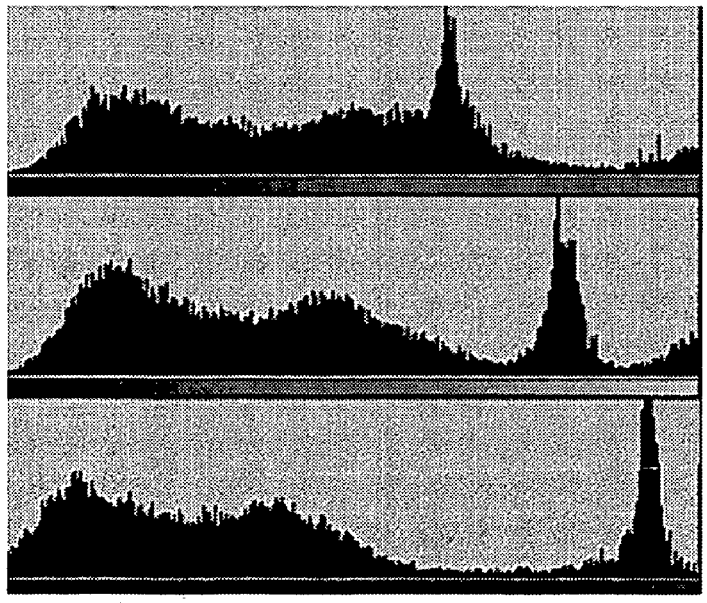

FIGS. 5A and 5B illustrate how the blocks of each image are compared to each other using color histograms, and more specifically show how the RGB color histograms of the center block of each picture are compared. Even though there is a slight shift between the two images, these figures show that the color histograms for the center block are basically the same. The only noticeable difference is the observable peak in the right part of the histogram of the block of picture B (FIG. 5B). This peak corresponds to the small amount of water present in the center block of picture B that is not present in the center block of picture A (FIG. 5A) due to the shift. This difference will not be a significant influence on the overall intersection value between these histograms.

FIG. 6 shows comparisons between the use of several 3×3 block histogram techniques, one without the use of time information and the others either with the use of time information in combination with the average of the nine histogram intersection values or with time information in combination with the set of rules (or a subset) described above in relation to FIG. 1. More specifically, the curve in FIG. 6 labeled 3×3+time.3, which follows the process shown in FIG. 1, shows the improvements realized by the application of the set of rules described above in relation to FIG. 1. The best solution was obtained using the following set of thresholds: $T_1$0.54; $T_2$=0.43; $T_3$=0.57; $T_4$=0.495; $T_5$=0.62; $T_6$=2; $T_7$=0.62; $T_8$=8; N=2. The result achieved is Recall=0.68 and Precision=0.81. This represents an improvement of 0.045 or 6% in Precision at equal Recall compared with the basic technique using time information.

FIG. 7 shows a table summarizing the improvements made to the duplicate detection method, in particular showing that the technique according to the invention achieves a significant improvement compared with the block-based histogram technique (an increase of 5.4% in Recall and 23.8% in Precision can be observed).

In another embodiment, If no time and date information is available, the block histogram analysis alone provides a method for determining duplicates in an automatic albuming system. Referring to a subset of steps in FIG. 1, after inputting the images in step S10 determine in step S12 if each individual histogram intersection value (except the center block) is higher than a certain threshold $T_1$, and count the number of intersection values below that threshold. Check whether the number of intersection values below that threshold are found in step S14 to be greater than a certain number N. Compute in step S15 the average histogram intersection of blocks 5 and 8. Check in step S16 whether that average is less than a certain threshold $T_2$, and check in step S18 whether that average is higher than a certain threshold $T_3$. Compute the average of the all histogram intersection values and check in step S20 whether the average of all histogram intersection values is higher than a threshold $T_4$. Finally, check in step S22 whether the average of all histogram intersection values is higher than a threshold $T_5$ (with $T_5 < T_4$). Then, these various computations are applied as shown in the appropriate parts of FIG. 1 to determine if the input images are duplicates.

Figure 8:
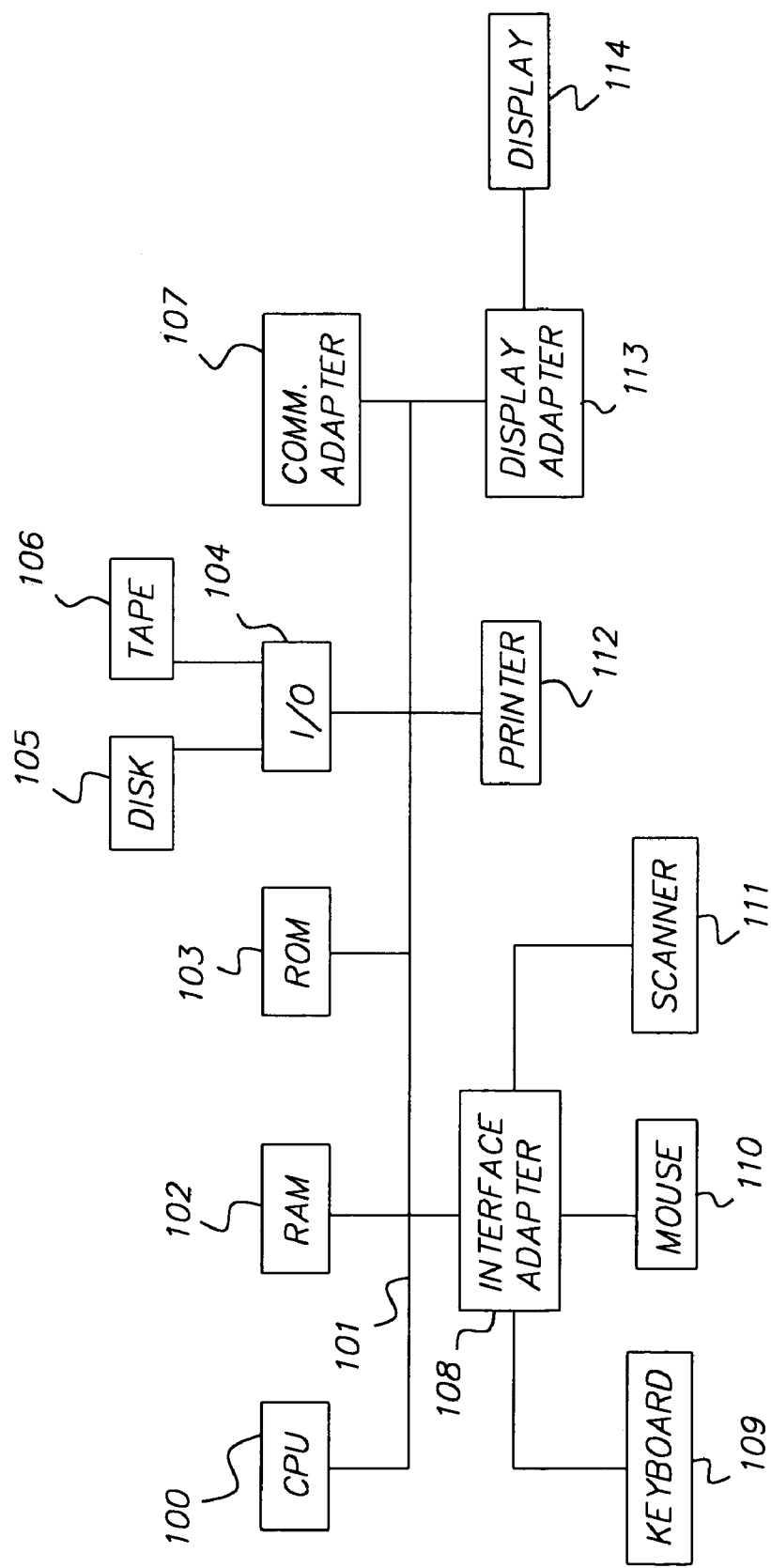
FIG. 8 is a block diagram of a computer system for implementing the present invention.

While the overall methodology of the invention is described above, the invention can be embodied in any number of different types of systems and executed in any number of different ways, as would be known by one ordinarily skilled in the art. It facilitates understanding to note that the present invention is preferably utilized on any well-known computer system, such as a personal computer. It is also instructive to note that the images may be either directly input into the computer system (for example by a digital camera) or digitized before input into the computer system (for example by scanning). For example, as illustrated in FIG. 8, a typical hardware configuration of an information handling/computer system useful in implementing the invention preferably has at least one processor or central processing unit (CPU) 100. The CPU 100 is interconnected via a system bus 101 to a random access memory (RAM) 102, a read-only memory (ROM) 103, an input/output (I/O) adapter 104 (for connecting peripheral devices such as disk units 105 and tape drives 106 to the bus 101), a communication adapter 107 (for connecting an information handling system to a data processing network, such as the Internet), a user interface adapter 108 (for connecting peripherals 109, 110, 111 such as a keyboard, mouse, digital image input unit (e.g., a scanner or a camera), microphone speaker and/or other user interface device to the bus 101), a printer 112 and a display adapter 113 (for connecting the bus 101 to a display device 114). The invention could be implemented using the structure shown in FIG. 8 by including the inventive method within a computer program stored, e.g., on the storage device 105. Such a computer program would act on a time series of image frames supplied through the interface adapter 108 or through the network connection 107 in order to detect duplicates. The system would then automatically produce the desired digital image frame output (without duplicates) on the display 114, the printer 112 or sent back to the network 107.

The invention has been described with reference to a preferred embodiment. However, it will be appreciated that variations and modifications can be effected by a person of ordinary skill in the art without departing from the scope of the invention.

PARTS LIST

100 CPU
101 bus
102 RAM
103 ROM
104 I/O adapter
105 disk unit
106 tape drive
107 communication adapter
108 interface adapter
109 keyboard
110 mouse
111 digital image input unit
112 printer
113 display adapter
114 display device

What is claimed is:

1. A method for detecting duplicate images comprising the steps of:
   (a) providing a plurality of images captured at determinable times;
   (b) dividing each image into an X number of blocks, wherein one or more blocks represent a central area and a foreground area;
   (c) computing histograms for each block of each image, and block histogram intersection values obtained from comparisons between histograms from corresponding blocks from each image;
   (d) determining whether each block histogram intersection value for at least those blocks surrounding the central area is higher than a threshold $T_1$, and determining whether the number of intersection values below the threshold $T_1$ are not greater than a certain number N;
   (e) computing an average histogram intersection value of the foreground area, and determining whether the average block histogram intersection value of the foreground area is not lower than a threshold $T_2$;
   (f) determining whether the average histogram intersection value of the foreground is higher than a threshold $T_3$;
   (g) determining whether an average of the X number of block histogram intersection values is higher than a threshold $T_4$;
   (h) determining whether the average of the X number of block histogram intersection values is higher than a threshold $T_5$;
   (i) determining whether the time difference between capture of the images is less than a threshold $T_6$;
   (j) determining whether the average of the X number of block histogram intersection values is higher than a threshold $T_7$; and
   (k) determining whether the time difference between the capture of the images is less than a threshold $T_8$; and
   (l) utilizing the determinations made in steps (d) through (k) to determine if any of the images are duplicates.

2. The method as recited in claim 1 wherein said step (h) further provides that $T_5 < T_4$.

3. The method as recited in claim 1 wherein said step (j) further provides that $T_5 < T_4 < T_7$.

4. The method as recited in claim 1 wherein said step (k) further provides that $T_6 < T_8$.

5. The method as recited in claim 1 wherein said step (b) comprises dividing each image into a configuration of 4×4 or fewer blocks.

6. The method as recited in claim 5 wherein said step (b) comprises dividing each image into a configuration of 3×3 blocks.

7. The method of claim 1 wherein said step (b) comprises dividing each image into a configuration of 4×4 or 3×3 blocks.

8. A method for detecting duplicate images comprising the steps of:
   (a) providing a plurality of images;
   (b) dividing each image into an X number of blocks, wherein one or more blocks represent a central area and a foreground area;

(c) computing histograms for each block, and block histogram intersection values obtained from comparisons between histograms from corresponding blocks from each image;

(d) determining whether each block histogram intersection value for at least those blocks surrounding the center block is higher than a threshold $T_1$, and determining whether the number of intersection values below the threshold $T_1$ are not greater than a certain number N;

(e) computing an average histogram intersection value of the foreground area, and determining whether the average block histogram intersection value of the foreground area is not lower than a threshold $T_2$;

(f) determining whether the average histogram intersection value of the foreground is higher than a threshold $T_3$;

(g) determining whether an average of the X number of block histogram intersection values is higher than a threshold $T_4$;

(h) determining whether the average of the X number of block histogram intersection values is higher than a threshold $T_5$; and (i) utilizing the determinations made in steps (d) through (h) to determine if any of the images are duplicates.

9. The method as recited in claim 8 wherein said step (h) further provides that $T_5 < T_4$.

10. The method as recited in claim 8 wherein said step (b) comprises dividing each image into a configuration of 4×4 or fewer blocks.

11. The method as recited in claim 10 wherein said step (b) comprises dividing each image into a configuration of 3×3 blocks.

12. A computer program product for detecting duplicate images comprising: a computer readable storage medium having a computer program stored thereon for performing the steps of:

(a) providing a plurality of images captured at determinable times;

(b) dividing each image into an X number of blocks, wherein one or more blocks represent a central area and a foreground area;

(c) computing histograms for each block of each image, and block histogram intersection values obtained from comparisons between histograms from corresponding blocks from each image;

(d) determining whether each block histogram intersection value for at least those blocks surrounding the central area is higher than a threshold $T_1$, and determining whether the number of intersection values below the threshold $T_1$ are not greater than a certain number N;

(e) computing an average histogram intersection value of the foreground area, and determining whether the average block histogram intersection value of the foreground area is not lower than a threshold $T_2$;

(f) determining whether the average histogram intersection value of the foreground is higher than a threshold $T_3$;

(g) determining whether an average of the X number of block histogram intersection values is higher than a threshold $T_4$;

(h) determining whether the average of the X number of block histogram intersection values is higher than a threshold $T_5$;

(i) determining whether the time difference between capture of the images is less than a threshold $T_6$;

(j) determining whether the average of the X number of block histogram intersection values is higher than a threshold $T_7$; and (k) determining whether the time difference between the capture of the images is less than a threshold $T_8$; and (l) utilizing the determinations made in steps (d) through (k) to determine if any of the images are duplicates.

13. The computer program product as recited in claim 12 wherein said step (h) further provides that $T_5 < T_4$.

14. The computer program product as recited in claim 12 wherein said step (j) further provides that $T_5 < T_4 < T_7$.

15. The computer program product as recited in claim 12 wherein said step (k) further provides that $T_6 < T_8$.

16. The computer program product as recited in claim 12 wherein said step (b) comprises dividing each image into a configuration of 4×4 or fewer blocks.

17. The computer program product as recited in claim 16 wherein said step (b) comprises dividing each image into a configuration of 3×3 blocks.

18. The computer program product as recited in claim 12 wherein said step (b) comprises dividing each image into a configuration of 4×4 or 3×3 blocks.

19. A computer program product for detecting duplicate images comprising: a computer readable storage medium having a computer program stored thereon for performing the steps of:

(a) providing a plurality of images;

(b) dividing each image into an X number of blocks, wherein one or more blocks represent a central area and a foreground area;

(c) computing histograms for each block, and block histogram intersection values obtained from comparisons between histograms from corresponding blocks from each image;

(d) determining whether each block histogram intersection value for at least those blocks surrounding the center block is higher than a threshold $T_1$, and determining whether the number of intersection values below the threshold $T_1$ are not greater than a certain number N;

(e) computing an average histogram intersection value of the foreground area, and determining whether the average block histogram intersection value of the foreground area is not lower than a threshold $T_2$;

(f) determining whether the average histogram intersection value of the foreground is higher than a threshold $T_3$;

(g) determining whether an average of the X number of block histogram intersection values is higher than a threshold $T_4$;

(h) determining whether the average of the X number of block histogram intersection values is higher than a threshold $T_5$; and (i) utilizing the determinations made in steps (d) through (h) to determine if any of the images are duplicates.

20. The computer program product as recited in claim 19 wherein said step (h) further provides that $T_5 < T_4$.

21. The computer program product as recited in claim 20 wherein said step (b) comprises dividing each image into a configuration of 4×4 or fewer blocks.

22. The computer program product as recited in claim 21 wherein said step (b) comprises dividing each image into a configuration of 3×3 blocks.

23. The computer program product as recited in claim 19 wherein said step (b) comprises dividing each image into a configuration of 4×4 or 3×3 blocks.

24. A system for detecting duplicate images comprising:
(a) means for providing a plurality of images captured at determinable times;
(b) means for dividing each image into an X number of blocks, wherein one or more blocks represent a central area and a foreground area;
(c) means for computing histograms for each block of each image, and block histogram intersection values obtained from comparisons between histograms from corresponding blocks from each image;
(d) means for determining whether each block histogram intersection value for at least those blocks surrounding the central area is higher than a threshold $T_1$, and determining whether the number of intersection values below the threshold $T_1$ are not greater than a certain number N;
(e) means for computing an average histogram intersection value of the foreground area, and determining whether the average block histogram intersection value of the foreground area is not lower than a threshold $T_2$;
(f) means for determining whether the average histogram intersection value of the foreground is higher than a threshold $T_3$;
(g) means for determining whether an average of the X number of block histogram intersection values is higher than a threshold $T_4$;
(h) means for determining whether the average of the X number of block histogram intersection values is higher than a threshold $T_5$;
(i) means for determining whether the time difference between capture of the images is less than a threshold $T_6$;
(j) means for determining whether the average of the X number of block histogram intersection values is higher than a threshold $T_7$; and
(k) means for determining whether the time difference between the capture of the images is less than a threshold $T_8$; and
(l) means for utilizing the determinations made in steps (d) through (k) to determine if any of the images are duplicates.

25. A system for detecting duplicate images comprising:
(a) means for providing a plurality of images;
(b) means for dividing each image into an X number of blocks, wherein one or more blocks represent a central area and a foreground area;
(c) means for computing histograms for each block, and block histogram intersection values obtained from comparisons between histograms from corresponding blocks from each image;
(d) means for determining whether each block histogram intersection value for at least those blocks surrounding the center block is higher than a threshold $T_1$, and determining whether the number of intersection values below the threshold $T_1$ are not greater than a certain number N;
(e) means for computing an average histogram intersection value of the foreground area, and determining whether the average block histogram intersection value of the foreground area is not lower than a threshold $T_2$;
(f) means for determining whether the average histogram intersection value of the foreground is higher than a threshold $T_3$;
(g) means for determining whether an average of the X number of block histogram intersection values is higher than a threshold $T_4$;
(h) means for determining whether the average of the X number of block histogram intersection values is higher than a threshold $T_5$; and
(i) means for utilizing the determinations made in steps (d) through (h) to determine if any of the images are duplicates.

* * * * *